Aug. 6, 1935.  T. M. LAHR  2,010,673
DIE AND METHOD OF MAKING THE SAME
Filed July 12, 1933
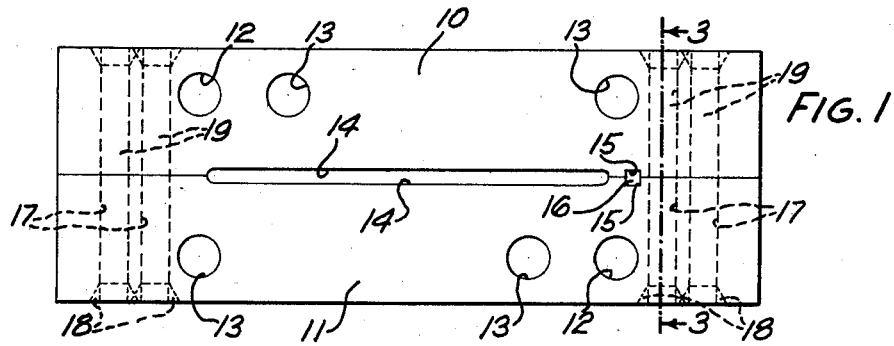
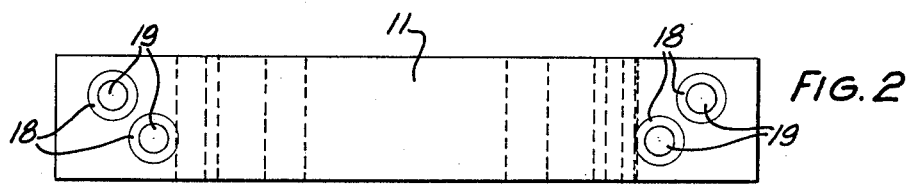
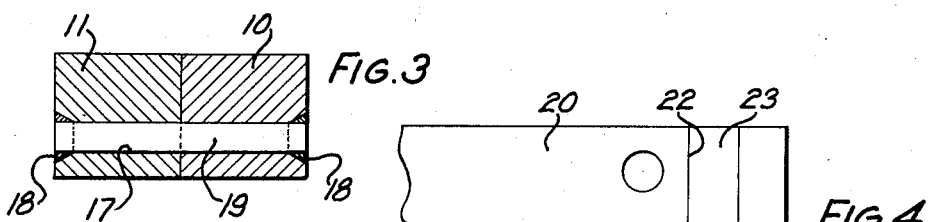
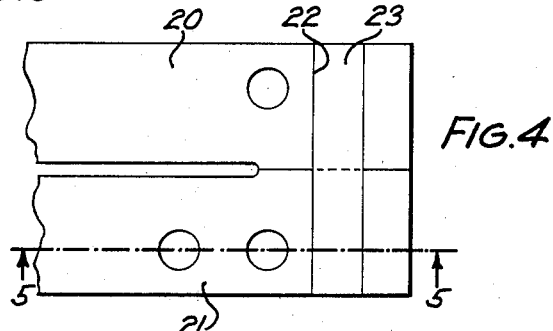
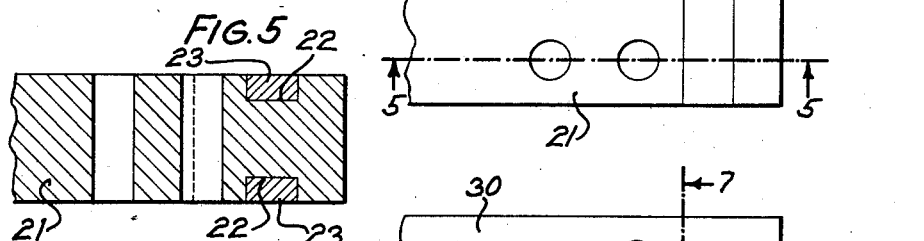
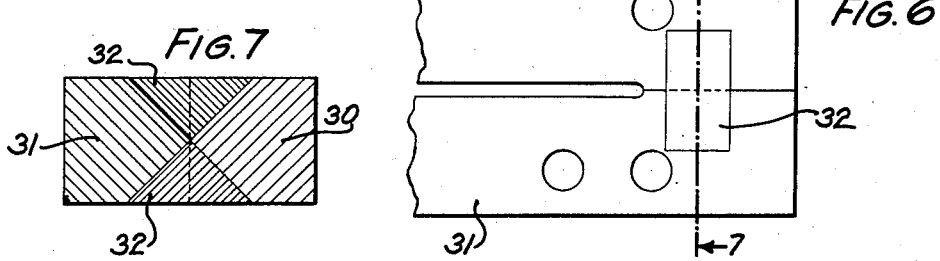
INVENTOR
T. M. LAHR
BY H. A. Whiteborn
ATTORNEY Patented Aug. 6, 1935

2,010,673

UNITED STATES PATENT OFFICE 2,010,673

DIE AND METHOD OF MAKING THE SAME

Thomas M. Lahr, Berwyn, Ill., assignor to Western Electric Company, Incorporated, New York, N. Y., a corporation of New York Application July 12, 1933, Serial No. 680,035

3 Claims. (Cl. 76—107)

This invention relates to a die, and more particularly to a method of making a die.

The object of the invention is to provide a more efficient, practical and economical method of making dies and to provide a composite die having substantially the same strength and precision as a one piece die.

In accordance with the object, one embodiment of the invention contemplates the method of making a die in which the die is formed of two parts having partially formed therein recesses for the aperture of the die when assembled, hardening the surfaces of these recesses, finishing the surfaces to the required dimensions, forming apertures in the ends of the parts, countersinking the outer extremities of said apertures, inserting heated rods in said apertures, and welding the ends of said rods to said parts.

Another embodiment of the invention consists of a method of making a die in which the die is made in two parts, forming grooves in the upper and lower surfaces of the parts, placing rods in the grooves and welding the rods in place while the parts are assembled.

Another embodiment comprises forming V-shaped grooves adjacent the ends of the parts of the die and filling the grooves by welding.

Other objects and advantages will be apparent from the following detailed description taken in conjunction with the accompanying drawing, wherein Fig. 1 is a top plan view of a die illustrating one embodiment of the invention;

Fig. 2 is a side elevational view of the die shown in Fig. 1;

Fig. 3 is a horizontal sectional view taken along the line 3—3 of Fig. 1;

Fig. 4 is a fragmentary top plan view of a die illustrating another embodiment of the invention.

Fig. 5 is a fragmentary sectional view taken along the line 5—5 of Fig. 4;

Fig. 6 is a fragmentary top plan view of a die illustrating still another embodiment of the invention, and Fig. 7 is a sectional view taken along the line 7—7 of Fig. 6.

Referring now to the drawing, the die shown in Figs. 1, 2 and 3 consists of parts 10 and 11 composed of a suitable metal for dies in metal punching operations. They are drilled at 12 for the necessary dowel holes and at 13 for the necessary screw holes for securing the die in place when assembled. The parts 10 and 11 of the die have recesses 14 formed therein with desired dimensions, allowing sufficient additional material for finishing after the hardening of these surfaces. Furthermore, keyways 15 are formed in adjacent edges of the parts for receiving a key 16 to hold the parts against relative movement when assembled and during the assembling operation. The parts 10 and 11 are then subjected to a heat treatment to harden the surfaces after which the surfaces of the recesses 14 are finished by the necessary finishing and stoning operations. The parts 10 and 11 are then clamped together in the position they will assume when assembled, after which apertures 17 are drilled in the ends thereof at offset positions relative to each other, as illustrated in Fig. 2. The ends of the apertures 17 are countersunk as at 18, after which heated rods 19, preferably drill rods which are equal in length to the width of the parts 10 and 11 in assembly, are forced into the apertures 17 until their ends are flush with the sides of the parts. The rods 19 are heated to approximately 800° F.; that is, to a temperature sufficient to cause suitable expansion of the rods during assembly, resulting in desired drawing effect to hold the parts 10 and 11 firmly together when the rods cool after assembly.

Immediately after placing the hot rods 19 within the apertures 17, the welding operation is performed by filling the beveled ends 18 of the apertures 17 in steps, that is, by partially welding each end of each rod through one cycle of welding and continuing the cycle, gradually filling in the beveled ends of the apertures until the welding operation has been completed. In this manner of welding the temperature of the rods 19 is retained and the rods are uniformly welded in place. The rough surfaces at the welded portions may then be ground and the die is ready for use.

In Figs. 4 and 5 another embodiment of the invention is illustrated, wherein the die is formed of two parts 20 and 21 which are formed in the same manner as hereinbefore described of the parts 10 and 11 with the exception of the method of securing the parts together which comprises the machining of aligned grooves 22 in the upper and lower surfaces and at each end of the parts, placing rods 23 in the grooves and welding the rods in place while the parts are clamped in assembled position. The rods 23 may be heated similarly to the heating of the rods 19 (Fig. 1).

The form of the invention shown in Figs. 6 and 7 consists of forming the die in two parts 30 and 31 in the same manner in which the parts 10 and 11 (Fig. 1) are formed, with the exception of the securing of the parts together. In this embodiment of the invention grooves are formed in the upper and lower surfaces of the parts so that when the parts are disposed adjacent to each other as in assembly, V-shaped grooves 32 are formed. In the welding operation the V-shaped grooves 32 are filled in steps by alternately welding each side to gradually and uniformly fill the grooves with welding material and eliminate any undue drawing of the material of the parts which would result if one groove should be welded complete and followed by the complete welding of the other grooves.

While the invention is particularly useful in making dies which have a narrow die opening found by previous experience to be particularly difficult to cut and dimension accurately from a one piece blank, the invention is not limited to this type of die nor to the particular methods of securing the parts together, which are illustrated.

What is claimed is:

1. The method of making a die comprising forming separate die sections with recesses to form an aperture in the finished die, cutting keyways in adjacent surfaces of the die sections, depositing a key in the keyways to secure the sections against relative movement, temporarily securing the sections so assembled, forming apertures adjacent the ends thereof outside of the zone of the die aperture, placing rods in the apertures, and welding the ends of the rods to their respective sections.

2. The method of making a die for metal punching operations which comprises forming two die sections having mating surfaces of extended area at their ends and the surfaces between said mating surfaces cooperating to form a die opening and securing said sections together by making alined openings in the sections through said mating surfaces, inserting heated rods in said openings and welding the ends of the rods to the die sections whereby upon cooling of the rods a strong pressure between said mating surfaces is produced.

3. A die for metal punching operations comprising two die sections having mating surfaces of extended area at their ends and surfaces between said mating surfaces cooperating to form a die opening, said sections having alined openings through said mating surfaces, and rods in said openings having their ends welded to the sections, said rods being under tension as a result of having been pre-expanded by heat and contracted by cooling.

THOMAS M. LAHR.